US010974209B2

(12) United States Patent
Kinoshita et al.

(10) Patent No.: US 10,974,209 B2
(45) Date of Patent: Apr. 13, 2021

(54) ION-EXCHANGE MEMBRANE

(71) Applicant: ASTOM Corporation, Tokyo (JP)

(72) Inventors: Maki Kinoshita, Shunan (JP);
Masayuki Kishino, Shunan (JP);
Shunichiro Nakatsukasa, Shunan (JP);
Kenji Fukuta, Shunan (JP)

(73) Assignee: ASTOM CORPORATION, Tokyo (JP)

( * ) Notice: Subject to any disclaimer, the term of this patent is extended or adjusted under 35 U.S.C. 154(b) by 126 days.

(21) Appl. No.: 16/326,009

(22) PCT Filed: Aug. 30, 2017

(86) PCT No.: PCT/JP2017/031245
§ 371 (c)(1),
(2) Date: Feb. 15, 2019

(87) PCT Pub. No.: WO2018/047700
PCT Pub. Date: Mar. 15, 2018

(65) Prior Publication Data
US 2019/0176098 A1    Jun. 13, 2019

(30) Foreign Application Priority Data
Sep. 6, 2016  (JP) .............................. JP2016-173982

(51) Int. Cl.
B01D 71/28    (2006.01)
B01D 71/26    (2006.01)
B01D 67/00    (2006.01)
C08J 5/22     (2006.01)
B01D 69/02    (2006.01)
B01D 61/46    (2006.01)
B01J 47/12    (2017.01)
B01D 69/14    (2006.01)

(52) U.S. Cl.
CPC ......... B01D 71/28 (2013.01); B01D 67/0006 (2013.01); B01D 67/0093 (2013.01); B01D 69/02 (2013.01); B01D 69/141 (2013.01); B01D 71/26 (2013.01); B01J 47/12 (2013.01); C08J 5/22 (2013.01); B01D 61/46 (2013.01); B01D 2325/20 (2013.01); B01D 2325/42 (2013.01)

(58) Field of Classification Search
CPC .... B01D 71/28; B01D 71/26; B01D 67/0006; B01D 67/0093; B01D 69/02; B01D 69/141; B01D 61/46; B01D 2325/20; B01D 2325/42; C08J 5/22; B01J 47/12
USPC ......................................................... 521/27
See application file for complete search history.

(56) References Cited

U.S. PATENT DOCUMENTS 3,970,718 A        7/1976  Takahashi et al.
2003/0008935 A1*   1/2003  Yamamoto ................. C08J 3/28
                                                  522/114

FOREIGN PATENT DOCUMENTS

| GB | 2 448 159 A | 10/2008 |
| JP | 6-37568 B2 | 5/1994 |
| JP | 6-322156 A | 11/1994 |
| JP | 10-180123 A | 7/1998 |
| JP | 10180123 A * | 7/1998 |
| JP | 2003-12835 A | 1/2003 |
| JP | 2003012835 A * | 1/2003 |
| JP | 3461991 B2 | 10/2003 |
| JP | 2012-224708 A | 11/2012 |
| JP | 2012224708 A * | 11/2012 |

OTHER PUBLICATIONS

International Search Report (PCT/ISA/210) issued in PCT/JP2017/031245, dated Nov. 28, 2017.
Extended European Search Report issued in corresponding European Patent Application No. 17848640.3 dated Apr. 3, 2020.

* cited by examiner

Primary Examiner — Michael Bernshteyn
(74) Attorney, Agent, or Firm — Birch, Stewart, Kolasch & Birch, LLP

(57) ABSTRACT

A polymerizable composition for forming an ion-exchange resin precursor, the polymerizable composition containing a monomer component and polyethylene particles in an amount of 50 to 120 parts by mass per 100 parts by mass of the monomer component, wherein the monomer component contains an aromatic monomer for introducing ion-exchange groups and a nitrogen-containing aliphatic monomer, the nitrogen-containing aliphatic monomer being present in an amount of 10 to 35% by mass in said monomer component. An ion-exchange membrane is produced by applying the polymerizable composition onto a polyolefin type filament base material and polymerizing the polymerizable composition to form an ion-exchange resin precursor and, thereafter, introducing ion-exchange groups into the precursor.

5 Claims, No Drawings

ION-EXCHANGE MEMBRANE

TECHNICAL FIELD

This invention relates to an ion-exchange membrane. More specifically, the invention relates to a polymerizable composition for forming an ion-exchange resin precursor for use in the production of an ion-exchange membrane, to a method of producing an ion-exchange membrane using the same composition, and to an ion-exchange membrane obtained by the same method.

BACKGROUND ART

Ion-exchange membranes have a structure in which an ion-exchange resin is held in a specific base material. The membrane has only a small strength when it is formed by using the ion-exchange resin alone. When used being immersed in a liquid, further, the membrane swells and undergoes a large change in its form, and is not suited for the practical use. Therefore, the ion-exchange membrane has been used in a form that is obtained by holding an ion-exchange resin in a base material that has a predetermined strength so will not to swell, so will not to change its form, and so will not to impair the ion-exchange capability specific to the ion-exchange resin.

It is a widely accepted practice that the above ion-exchange membrane uses a woven fabric of polyvinyl chloride as the base material. However, the ion-exchange membrane using the polyvinyl chloride as the base material has some defects, i.e., small resistance against the heat and small resistance against the chemicals. In recent years, therefore, study has been forwarded extensively concerning the ion-exchange membranes using a polyolefin such as polyethylene or polypropylene as the base material.

The ion-exchange membranes using the polyolefin as the base material have very larger resistance against the heat and chemicals than those using the polyvinyl chloride as the base material, but also have poor adhesiveness between the polyolefin base material and the ion-exchange resin. Therefore, the ion-exchange resin and the base material tend to separate away from each other after they are subjected to the swelling and drying (shrinking) repetitively. As a result, the ion-exchange membrane is accompanied by such problems as a decrease in the function as the diaphragm, an increase in the permeation of water therethrough and a decrease in the current efficiency. Moreover, a decrease in the adhesiveness between the polyolefin base material and the ion-exchange resin results in a decrease in the durability, as a matter of course.

As a means for improving the adhesiveness between the polyolefin base material and the ion-exchange resin, there can be, usually, considered a means for treating the surfaces of the polyolefin base materials by the irradiation with electron rays or by the treatment with corona discharge. Such a means, however, requires an apparatus of a large scale and, besides, impairs the strength of the polyolefin base material, and cannot be put into practice without difficulty. Therefore, a variety of means have been proposed for improving the adhesiveness.

For example, a patent document 1 proposes an ion-exchange membrane using, as the base material, a woven fabric comprising a multifilament of a polyethylene having a weight average molecular weight of not less than $10^5$ (so-called high molecular polyethylene). There is described that the ion-exchange membrane features not only an improved strength due to the multifilament of the very high molecular polyethylene but also an improved adhesiveness between the ion-exchange resin and the base material because of an increase in the contact area between them.

However, the very high molecular polyethylene is a special polymer that is very difficult to form based on an ordinary method, and is very expensive. Besides, the woven fabric comprising the multifilament thereof is very difficult to obtain.

Therefore, there has been urged to develop a means for improving the adhesiveness even by using a monofilament woven fabric that is available easily and inexpensively.

Further, a patent document 2 proposes a method of producing an ion-exchange membrane by applying, onto a base material of a polyethylene fabric, a monomer paste that contains fine polyethylene particles of a particle size of not more than 10 μm for forming an ion-exchange resin precursor, polymerizing the monomer paste and, thereafter, introducing ion-exchange groups into the thus formed ion-exchange resin precursor. According to this method, the fine polyethylene particles work as a thickener and hence impart a suitable degree of viscosity and spinnability to the monomer paste which, therefore, can be evenly adhered to the base material of polyethylene fabric. Further, the obtained ion-exchange membrane forms an island-sea structure comprising the polyethylene that is distributed like a sea and the ion-exchange resin that is distributed like islands. The polyethylene continuing like the sea melt-adheres to the base material of the polyethylene fabric. Therefore, the adhesion is improved between the base material and the ion-exchange resin despite the base material is made from the woven fabric of monofilaments.

This method, however, requires the heat treatment at a high temperature to melt the base material of the polyethylene fabric and is, therefore, accompanied by a problem of a decrease in the mechanical strength of the ion-exchange membrane that is obtained. Besides, even if an improved adhesiveness is once obtained, gaps develop between the base material and the ion-exchange resin as the ion-exchange resin swells and contracts repetitively, permitting water to permeate through in increasing amounts and, as a result, causing a decrease in the electric current efficiency. Therefore, it has been urged to further improve the adhesiveness.

Moreover, a patent document 3 is proposing a method of producing an ion-exchange membrane by using fine particles of an ethylene/polyethylene modified with α-unsaturated carboxylic acid, such as acrylic acid-modified polyethylene (fine particles of acid-modified polyethylene), instead of using the fine polyethylene particles that are used by the method of the above patent document 2.

The above method is to improve the method of the patent document 2, and forms an island-sea structure comprising the acid-modified polyethylene distributed like a sea and the ion-exchange resin distributed like islands. According to this method, a high degree of adhesiveness is secured between the sea-like acid-modified polyethylene and the island-like ion-exchange resin since affinity is high between the acid-modified fine polyethylene particles and the monomer for forming the ion-exchange resin (or precursor) and, besides, since a graft polymerization takes place in the interface between the acid-modified fine polyethylene particles and the island-like ion-exchange resin.

According to this method, however, despite the adhesiveness is secured between the sea-like acid-modified polyethylene and the island-like ion-exchange resin, the adhesiveness is not improved between the polyethylene base material and the ion-exchange resin. Specifically, when the base material is a woven fabric of inexpensive monofilaments, the contact area is not secured to a sufficient degree between the ion-exchange resin and the base material still leaving, therefore, the problem of lack of adhesiveness.

PRIOR ART DOCUMENTS

Patent Documents

Patent document 1: JP-A-6-322156
Patent document 2: Japanese Patent Publication No. 6-37568
Patent document 3: Japanese Patent No. 3461991

OUTLINE OF THE INVENTION

Problems that the Invention is to Solve

It is, therefore, an object of the present invention to provide an ion-exchange membrane that secures excellent adhesiveness between a polyolefin type base material and an ion-exchange resin, to provide a composition used for the production of the ion-exchange membrane, and to provide a method of producing the ion-exchange membrane.

Means for Solving the Problems

In producing ion-exchange membranes based on a customary method, the present inventors have discovered that there can be obtained an ion-exchange membrane that exhibits excellent adhesiveness between the polyolefin base material and the ion-exchange resin if a nitrogen-containing aliphatic monomer as represented by acrylonitrile is made present in a monomer that is used for producing an ion-exchange resin precursor (resin having a functional group capable of introducing an ion-exchange group), and have thus completed the invention.

According to the present invention, therefore, there is provided a polymerizable composition for forming an ion-exchange resin precursor, the polymerizable composition containing a monomer component and polyethylene particles in an amount of 50 to 120 parts by mass per 100 parts by mass of the monomer component, wherein the monomer component contains an aromatic monomer for introducing ion-exchange groups and a nitrogen-containing aliphatic monomer, the nitrogen-containing aliphatic monomer being present in an amount of 10 to 35% by mass in the monomer component.

In the polymerizable composition for forming the ion-exchange resin precursor, it is desired that:
(1) The nitrogen-containing aliphatic monomer is an acrylonitrile; and
(2) The polyethylene particles are unmodified polyethylene particles.

According to the present invention, further, there is provided a method of producing an ion-exchange membrane by applying the above polymerizable composition onto a polyolefin type filament base material and polymerizing the composition to form an ion-exchange resin precursor and, thereafter, introducing ion-exchange groups into the precursor.

In the above method of production, it is desired that:
(1) The polyolefin type filament base material is a polyolefin type monofilament base material; and
(2) The polyolefin type filament base material is a polyethylene type filament base material.

Further, according to the present invention, there is provided an ion-exchange membrane obtained by the above-mentioned method of production.

That is, the ion-exchange membrane has a structure in which an ion exchanger is filled in the voids in the polyolefin type filament base material, and is obtained by the above-mentioned method of production. Therefore, the ion-exchange membrane has a water permeability of not more than 50 ml/(m$^2$·hour) as measured by using the water under a pressure of 0.1 MPa.

Moreover, the ion exchanger contains an aromatic ion-exchange resin and a polyethylene as the resin components.

The aromatic ion-exchange resin contains a constituent unit derived from the nitrogen-containing aliphatic monomer.

In the invention, the unmodified polyethylene stands for a polyethylene that has not been modified with acid, i.e., stands for a polyethylene free of constituent units that are derived from the comonomers having acid groups such as of acrylic acid or anhydrous maleic acid.

Effects of the Invention

In the ion-exchange membrane of the present invention, the voids in the polyolefin type filament base material are filled with the ion exchanger. The ion-exchange membrane is the same as the conventional ion-exchange membranes in regard to that it has a sea-island structure in which the ion-exchange resin is distributed like islands in the polyethylene that is distributed like a sea being derived from the polyethylene particles. Here, however, an important feature resides in that the constituent units derived from the nitrogen-containing aliphatic monomer have been introduced in the ion-exchange resin.

Namely, since the constituent units have been introduced, the ion-exchange resin exhibits excellent adhesiveness to the polyethylene distributed like the sea and to the polyolefin type filament base material, and suppresses the water permeability to lie in a range which is as low as not more than 50 ml/(m$^2$·hour) as measured by using the water under a pressure of 0.1 MPa.

Though the mechanism for exhibiting such excellent adhesiveness has not yet been known in detail, it is considered that the adhesiveness increases since the ion-exchange resin becomes more flexible as it has the constituent units derived from the nitrogen-containing aliphatic monomer. As a result, the ion-exchange resin is less likely to be separated from the polyolefin filament base material despite the ion-exchange resin is unavoidably swollen and shrunk in the process of producing the ion-exchange membrane. Moreover, it is estimated that the ion-exchange resin and the polyolefin that constitutes the base material have main chain structures that are similar to each other exhibiting, therefore, improved affinity to the polyolefin filament base material.

Here, the water permeability which is low means that the gaps are formed in small amounts in the step of producing the exchange membrane or when a predetermined pressure is applied at the time of measuring the water permeability. Namely, this means that the ion-exchange resin has been firmly adhered to the polyolefin type filament base material and to the sea-like polyethylene. In the ion-exchange membrane of the present invention, therefore, the base material is firmly adhered to the ion exchanger that is filled in the voids in the base material. As a result, the ion-exchange membrane features excellent durability, small electric resistance and high current efficiency when it is used for the electrodialysis or the like.

In the present invention, the above-mentioned excellent adhesiveness is realized not only when the base material is made from the multifilaments but also when the base material is made from the monofilaments which are easily available and inexpensive. This makes the greatest advantage of the present invention.

MODES FOR CARRYING OUT THE INVENTION

The ion-exchange membrane of the present invention is produced by using a specific polymerizable composition for forming an ion-exchange resin precursor, by applying the polymerizable composition onto a polyolefin type filament base material, executing the polymerization in this state to form an ion-exchange resin precursor and, finally, introducing ion-exchange groups into the precursor.

<Composition for Forming the Ion-Exchange Resin Precursor>

The ion-exchange membrane of the present invention is formed by using a polymerizable composition for forming an ion-exchange resin precursor. Namely, the polymerizable composition is polymerized to, first, form the ion-exchange resin precursor. The ion-exchange resin precursor is a polymer which, by itself, has no ion-exchange group but has a functional group that is capable of introducing an ion-exchange group. Therefore, the ion-exchange resin is formed by reacting the above precursor with a compound having an ion-exchange group.

In the invention, the polymerizable composition for forming the ion-exchange resin precursor (hereinafter often called simply polymerizable composition) contains a monomer component for forming the ion-exchange resin precursor by polymerization and a polymerization initiator, and, further, contains polyethylene particles for imparting spinnability and viscosity that is necessary for evenly adhering the polymerizable composition to the polyolefin type filament base material.

1. Monomer Component;

As the monomer component, the invention uses an aromatic monomer for introducing an ion-exchange group to form a basic skeleton of the ion-exchange resin precursor (or ion-exchange resin), a cross-linkable monomer, and a nitrogen-containing aliphatic monomer for forming a constituent unit that is introduced into the basic skeleton of the ion-exchange resin precursor (or ion-exchange resin) and that greatly contributes to improving the adhesiveness.

(1-1) Aromatic Monomer for Introducing an Ion-Exchange Group;

The aromatic monomer for introducing an ion-exchange group is a monofunctional compound that has a radically polymerizable group and that, further, has a functional group for introducing an ion-exchange group. The monomer having such a group has also been used for producing the conventional ion-exchange membranes. In the present invention, however, the monomer having the above group must be the aromatic one, i.e., the monomer having an aromatic group in the molecules thereof. This is because the aliphatic monomer having no aromatic group becomes so flexible that there cannot be formed an ion-exchange resin that has a predetermined strength or stability in the form.

The aromatic monomer has a radically polymerizable unsaturated group and an aromatic group, and is selected from those that are used when a cation-exchange resin is to be formed (i.e., monomers having a functional group for introducing a cation-exchange group) or from those that are used when an anion-exchange resin is to be formed (i.e., monomers having a functional group for introducing an anion-exchange group). In either case, there can be used the monomers known per se.

As the monomer having a functional group for introducing a cation-exchange group, there can be exemplified styrene, vinyltoluene, vinylxylene, α-methylstyrene, vinylnaphthalene and α-halogenated styrenes.

Further, as the monomer having a functional group for introducing an anion-exchange group, there can be exemplified styrene, bromobutylstyrene, vinyltolene, chloromethylstyrene, vinylpyridine, vinylimidazole, α-methylstyrene and vinylnaphthalene.

The above-mentioned aromatic monomers can be used in a single kind or in a combination of two or more kinds. It is, further, desired that the aromatic monomer is contained in the whole monomer components in an amount of at least not less than 25% by mass since it makes it possible to greatly lower the resistance of the ion-exchange membrane that is obtained. It is, further, desired that the aromatic monomer is contained in an amount of less than 60% by mass in the whole monomer components from the standpoint of lowering the water content in the ion exchanger and, specifically, suppressing the peeling from the polyolefin type filament base material when subjected to the swelling contraction repetitively. The aromatic monomer is specifically desirably contained in the whole monomer components in an amount of 30 to 55% by mass.

When the ion-exchange resin is to be produced, in general, there is used the aromatic monomer having an ion-exchange group, e.g., the aromatic monomer having an acid group such as sulfonic acid group or carboxylic acid group, or having a quaternary ammonium salt group. There can be also used a method that directly produces the ion-exchange resin by polymerization. However, the present invention does not employ the above method. It is necessary that the invention employs a method that uses a monomer having a functional group that is capable of introducing an ion-exchange group, and once forms an ion-exchange resin precursor and, thereafter, introduces the ion-exchange group into the precursor. As will be described later, the present invention must use the polyethylene particles. This is because if there is used a monomer having the ion-exchange group, then a homogeneously polymerizable composition is not obtained since the monomer is not compatible with the polyethylene particles.

(1-2) Crosslinkable Monomer;

The crosslinkable monomer is a monomer that is preferably used for densifying the ion-exchange resin, for suppressing the swelling and for improving the strength of the membrane. The above-mentioned aromatic monomer is a monofunctional compound having a radically polymerizable group whereas the crosslinkable monomer is a polyfunctional compound having not less than two radically polymerizable groups. Examples of the crosslinkable monomer include, though not specifically limited, divinyl compounds such as divinylbenzene, divinylsulfone, butadiene, chloroprene, divinylbiphenyl, divinylnaphthalene, diallylamine and divinylpyridine; and trivinyl compounds such as trivinylbenzene and the like, which can be used alone or in a combination of two or more kinds.

The crosslinkable monomer is, usually, used in an amount of 1 to 20% by mass and, specifically, 2 to 10% by mass in the whole monomer components.

(1-3) Nitrogen-Containing Aliphatic Monomer;

The invention uses the nitrogen-containing aliphatic monomer together with the above-mentioned aromatic monomer. The nitrogen-containing aliphatic monomer has a radically polymerizable group and a nitrogen-containing group. By using the nitrogen-containing aliphatic monomer in order to introduce the constituent unit derived from the monomer into the basic skeleton of the ion-exchange resin, it is made possible to greatly improve the adhesiveness of the ion-exchange resin to the polyolefin type filament base material being aided by the use of the polyethylene particles that will be described later. Besides, the adhesiveness to the polyethylene particles is improved, too. As a result, it is made possible to obtain an ion-exchange membrane that highly adheres to the ion exchanger (mixture of the ion-exchange resin and the polyethylene) permeating into the voids in the base material and that suppresses the water permeability down to lie in a predetermined low range.

The effect of improving the adhesiveness by the use of the nitrogen-containing aliphatic monomer was recognized as a phenomenon. Though the reason has not been clarified yet, the inventors estimate it as described below.

That is, if the constituent units are introduced by the use of the nitrogen-containing aliphatic monomer, then the main chain structures appear to resemble each other between the ion-exchange resin and the polyolefin that constitutes the base material depending, further, upon the polarity of the nitrogen-containing groups. Therefore, closely adhering property further increases in the interface between the polyolefin type filament base material and the polyethylene phase derived from the polyethylene particles. Moreover, presence of the constituent units derived from the aliphatic monomer imparts a suitable degree of flexibility to the ion-exchange resin. As a result, the ion-exchange resin follows up the filament base material and the polyethylene phase even when it is subjected to the swelling-contraction repetitively permitting less gaps to form between them.

As will be understood from the foregoing description, the nitrogen-containing aliphatic monomer must be a monofunctional radically polymerizable compound that has no aromatic group but has an ethylenically unsaturated bond. The nitrogen-containing aliphatic monomer having an aromatic group is not capable of imparting flexibility. The polyfunctional monomer such as a crosslinkable monomer causes the obtained ion-exchange resin to become dense and lowly flexible. In neither case, therefore, the adhesiveness cannot be improved.

From the above-mentioned point of view, the nitrogen-containing aliphatic monomer used in the present invention can be the compounds in which a polar nitrogen-containing group such as nitrile group or amide group is bonded to an aliphatic group that has a radically polymerizable unsaturated bond. Namely, the nitrogen-containing aliphatic monomer used in the present invention can be nitrile group-containing monomers such as acrylonitrile and methacrylonitrile; amide group-containing monomers such as acrylamide, methacrylamide, dialkylacrylamide, hydroxyethylacrylamide, isopropylacrylamide and dimethylaminopropylacrylamide; heterocyclic nitrogen-containing group-containing monomers such as acryloylmorpholine and vinylpyrrolidone; and amino group-containing monomers such as allylamine and the like, which may be used alone or in a combination of two or more kinds. Among them, the nitrile group-containing monomer is desired, and the acrylonitrile is most desired from such standpoints that the effect for improving the adhesiveness is exhibited to a maximum degree and that the capability of being copolymerized with the aromatic monomer is high.

The present invention uses the nitrogen-containing aliphatic monomer in an amount of 10 to 35% by mass and, specifically, 10 to 25% by mass in the whole monomer components. This is because if the amount of the nitrogen-containing aliphatic monomer is too small, the adhesiveness is not improved as desired. If the amount thereof is too large, on the other hand, properties such as the resistance and mechanical strength of the obtained ion-exchange membrane are impaired.

(1-4) Other Monomers;

The present invention uses the above-mentioned monomers as well as, as required, a comonomer that is capable of being copolymerized therewith in order to adjust the properties such as the strength and the like properties of the obtained ion-exchange resin, the copolymer being used in an amount in a suitable range in which it will not impair the ratio of amounts of the above-mentioned monomers. The comonomer shall not impair the functions of the above-mentioned nitrogen-containing aliphatic monomer, as a matter of course. Examples of the comonomer are styrene, methylstyrene, chloromethylstyrene, α-methylstyrene, acrolein, methyl vinyl ketone, vinylbiphenyl and the like.

2. Polymerization Initiators;

As the polymerization initiator, there can be used those that have been known per se. without any specific limitation. Concretely, there can be used such organic peroxides as octanoyl peroxide, lauroyl peroxide, tert-butylperoxy-2-ethyl hexanoate, benzoyl peroxide, tert-butylperoxy isobutylate, tert-butylperoxy laurate, tert-hexylperoxy benzoate and di-tert-butyloxy cyclohexane.

The polymerization initiator is used in an amount of, preferably, 0.1 to 20 parts by weight and, more preferably, 0.5 to 10 parts by weight per 100 parts by weight of the whole monomer components.

3. Polyethylene Particles;

The polymerizable composition used in the invention is blended with the polyethylene particles. That is, being blended with the fine polyethylene particles, the polymerizable composition is imparted with a suitable degree of viscosity and spinnability and, therefore, adheres evenly to the polyolefin type filament base material. When the polymerizable composition is polymerized, the fine polyethylene particles form a continuous phase that is distributed like a sea. The ion-exchange resin is distributed like islands in the sea-like continuous phase to thereby form a sea-islands structure. Here, no ion-exchange group is introduced into the polyethylene phase even in the step of introducing the ion-exchange groups that will be described later. Therefore, the water content is suppressed to be low in the ion exchanger (mixture of the ion-exchange resin and the polyethylene) that has permeated into the voids in the polyolefin type filament base material. As a result, the ion exchanger is not easily peeled off the polyolefin type filament base material despite of having undergone the swelling and drying (contraction).

The fine polyethylene particles are the same as those used by the method described in the patent document 2 (Japanese Patent Publication No. 6-37568) and, usually, comprise, preferably, fine particles having a particle size of not larger than 20 μm. That is, the polymerizable composition used in the present invention must assume the form of a paste and must have a suitable degree of viscosity and spinnability. If the particle size of the fine polyethylene particles is too large, however, the polymerizable composition exhibits a decreased viscosity and becomes difficult to be evenly adhered to the polyolefin type filament base material. Besides, the above-mentioned sea-islands structure that is formed upon polymerizing the polymerizable composition assumes a size that is too large resulting in a decrease in the adhesion between the ion-exchange resin and the polyethylene.

Moreover, the particles of a spherical shape are preferred to the amorphous particles obtained by the mechanical pulverization from such a standpoint that the particles are homogeneously distributed in the polymerizable composition to secure a viscosity that contributes to attaining favorable applicability.

Though there is no particular limitation, the polyethylene for forming the fine particles is the one that has a melting point lower than that of the polyolefin for forming the filament base material that will be described later and, most desirably, is a low-density polyethylene having a melting point of, for example, not higher than 120° C. (e.g., having a density of not less than 0.910 g/cm$^3$ but less than 0.930 g/cm$^3$). In the step of polymerizing the polymerizable composition that will be described later, the fine polyethylene particles are at least partly melted by heat and form a sea-like continuous phase that is in contact with the filament base material. At this moment, upon using the fine particles of polyethylene, it is made possible to form a continuous phase of polyethylene that is distributed like a sea being closely adhered to the filament base material and, therefore, it is allowed to further increase the adhesiveness of the ion exchanger to the filament base material.

The above polyethylene particles are used in an amount of 50 to 120 parts by mass and, specifically, 55 to 100 parts by mass per 100 parts by mass of the monomer components. If the polyethylene particles are used in too large amounts, the ion-exchange capability of the ion-exchange membrane is impaired. If the polyethylene particles are used in too small amounts, on the other hand, the adhesiveness is impaired between the ion exchanger (polymer component containing the ion-exchange resin and the polyethylene) in the membrane and the polyolefin base material, and the ion-exchange membrane having desired properties is not obtained.

4. Other Blending Agents;

The polymerizable composition for forming the ion-exchange resin precursor used in the invention may be blended with a plasticizer such as dioctyl phthalate (DOP) or acetyltributyl citrate for adjusting the applicability thereof, an epoxy compound such as ethylene glycol diglycidyl ether for trapping the hydrochloric acid generated by the thermal decomposition of the monomer component, and various other known additives in amounts in a range in which they do not impair the ion-exchange properties of the membrane that is finally formed or do not impair the functions of the above-mentioned nitrogen-containing aliphatic monomer and the polyethylene particles.

As required, further, it is also allowable to add the known thickeners in addition to the polyethylene particles to adjust the viscosity of the polymerizable composition so that it is more evenly adhered to the polyolefin type filament base material. As the thickener, there can be exemplified polyvinyl chloride, nitrile-butadiene rubber, styrene-butadiene rubber and hydrogenated products thereof, which are added in an amount, desirably, in a range of 0 to 30 parts by mass per 100 parts by mass of the whole monomer components in the polymerizable composition. Due to the addition of the thickeners, the polymerizable composition can be imparted with a suitable degree of viscosity without the need of increasing the amount of the fine polyethylene particles too much. Use of the polyvinyl chloride is most desired since it is capable of imparting viscosity to a sufficient degree despite of being added in small amounts.

The polymerizable composition for forming the ion-exchange resin precursor containing the above-mentioned various components can be easily prepared by homogeneously mixing various components together.

<Production of the Ion-Exchange Membranes>

The ion-exchange membrane of the present invention is produced by applying the above-mentioned polymerizable composition for forming the ion-exchange resin precursor onto the polyolefin type filament base material, polymerizing the polymerizable composition in a state of being filled in the voids in the filament base material and, thereafter, introducing the ion-exchange groups into the ion-exchange resin precursor that is formed by polymerization.

The base material of polyolefin type filaments works as a member for reinforcing the ion-exchange membrane, i.e., maintains the shape of the membrane and imparts a practical degree of strength to the membrane.

The filament base material referred to in the invention, generally, stands for a fabric formed by the aggregation of fibrous constituent units. There is no specific limitation on the form of the filament base material, which, therefore, may be a woven fabric, a nonwoven fabric or a mesh. In general, however, the woven fabrics such as plain fabric, twill and woven mesh are desired from the standpoint of retaining the shape of the ion-exchange membrane and strength. In these woven fabrics, further, the intersecting points of single yarns may have been heat-melt-adhered.

Furthermore, the filament base material may be the one formed by using monofilaments or may be the one formed by using multifilaments that are obtained by intertwisting a plurality of monofilaments (single yarns). However it is prefer that uses the one that is formed by using monofilaments. Namely, the multifilament is the one obtained by intertwisting a plurality of monofilaments, and provides an increased area of contact with the polymerizable composition yielding, therefore, an increased anchoring effect which is advantageous in obtaining an increased strength of adhesion accompanied, however, by such a defect that it is expensive. Therefore, the present invention uses the above-mentioned nitrogen-containing aliphatic monomer to obtain an increased strength of adhesion even when there are used inexpensive monofilaments. Namely, the present invention favorably uses the base material made from monofilamens, which is a great advantage of the invention.

The base material made from such filaments helps maintain a sufficient degree of strength of the ion-exchange membrane that is obtained. From the standpoint of maintaining the membrane resistance to remain low, on the other hand, it is desired that the filament base material assumes 10 to 300 mesh. It is, further, desired that the warps and wefts forming the woven fabric have a filament diameter in a range of 10 to 250 denier (20 to 200 μm) in order to maintain the strength of the ion-exchange membrane and to suppress an increase in the resistance caused by an increase in the thickness of the membrane. Similarly, in order to attain a balance between the strength of the ion-exchange membrane and the resistance of the membrane, the membrane using the base filament material has a thickness of 50 to 500 μm and an opening area of 20 to 60%.

Moreover, the polyolefin for forming the filament of the base material is not specifically limited, and there can be used polyethylene; polypropylene; poly 1-butene; poly 4-methyl-1-pentene; or a random or a block copolymer of α-olefins such as ethylene, propylene, 1-butene, or 4-methyl-1-pentene. Specifically, the polyethylene is most desired from the standpoint of exhibiting a high degree of affinity to the monomer component in the polymerizable composition and maintaining a high degree of adhesiveness between the base material and the ion exchanger.

Further, the filament base material that is used should, desirably, have a melting point higher than the melting point of the polyethylene particles so will not to undergo the thermal deformation when it is polymerized as will be described below but so as to form a sea-like continuous phase of the polyethylene derived from the above polyethylene particles. It is, therefore, desired that the filament base material has a melting point of, for example, not lower than 120° C.

From the above-mentioned point of view, therefore, a high-density polyethylene having a density of not less than 0.930 g/cm$^3$ is, preferably, used as the polyolefin for forming the filament base material.

Moreover, the polyethylene may have a very high molecular weight as proposed by the patent document 1. However, the polyethylene of such a very high molecular weight is not advantageous in cost. Accordingly, the polyethylene may be the one that has a molecular weight lying in an ordinary range (e.g., having a weight average molecular weight of less than $1\times10^5$).

The polymerizable composition is filled in the voids in the filament base material by, for example, dipping the filament base material in a vessel filled with the polymerizable composition. The polymerizable composition, however, can also be filled by spraying instead of dipping.

After the voids have been filled with the polymerizable composition as described above, the polyolefin type filament base material is fed into a polymerization apparatus such as a heating oven and is heated so that the polymerizable composition is polymerized.

The step of polymerization, usually, employs a method in which the polyolefin type filament base material containing voids filled with the polymerizable composition is sandwiched by films of a polyester or the like, and is heated starting from ordinary temperature under the application of a pressure. The pressure is, usually, about 0.1 to about 1.0 MPa, and is produced by using an inert gas such as nitrogen or by using rolls. Due to the application of pressure, the polymerization is carried out in a state where an excess of the polymerizable composition present in the interface of the filament base material on the outer side thereof is pushed into the voids in the filament base material, effectively preventing the occurrence of resin reservoirs.

Further, the polymerization conditions are dependent upon the kind of the polymerization initiator and the kind of the monomer. In the present invention, however, the polymerization is carried out at a temperature lower than the melting point of the polyolefin type filament base material but higher than the melting point of the polyethylene particles, e.g., in a temperature range of about 80 to about 120° C. This makes it possible to melt-flow the polyethylene particles simultaneously with the formation of a polymer (ion-exchange resin precursor) while preventing the polyolefin type filament base material from being deformed and, therefore, to form a continuous phase of polyethylene that is distributed like a sea.

The polymerization time differs depending on the polymerization temperature and the like but is, usually, about 3 to about 20 hours.

The ion-exchange resin precursor formed by the above polymerization operation is distributed like islands being surrounded by the continuous phase of polyethylene that is distributed like a sea in the voids in the filament base material, but remains partly in contact with the surface of the filament base material.

Here, the polymer or the ion-exchange resin precursor obtained as described above has a functional group for introducing an ion-exchange group but has no ion-exchange group. Therefore the ion-exchange groups are introduced after the above-mentioned step of polymerization.

The ion-exchange groups are introduced by a method known per se. When, for example, a cation-exchange membrane is to be produced, the ion-exchange groups are introduced by such a treatment as sulfonation, chlorosulfonation, phosphoniation or hydrolysis. When an anion-exchange membrane is to be produced, the ion-exchange groups are introduced by such a treatment as amination or alkylation.

<Ion-Exchange Membranes>

The ion-exchange membrane thus obtained has a structure in which the voids in the filament base material are filled firmly with the ion exchanger that comprises the ion-exchange resin distributed like islands and the continuous phase of polyethylene distributed like a sea.

In the ion-exchange membrane, the sea-like continuous phase of polyethylene is firmly adhered to the surface of the filament base material. Further, constituent units derived from the nitrogen-containing aliphatic monomer have been introduced into the ion-exchange resin that is in contact with the surface of the filament base material. Therefore, a high degree of adhesiveness is obtained among the ion-exchange resin, the sea-like continuous phase of polyethylene and the filament base material. Accordingly, the ion exchanger is firmly fixed to the filament base material.

Therefore, the ion-exchange membrane of the present invention has a water permeability which is as low as 50 ml/(m$^2$·hour) or less and, specifically, 25 ml/(m$^2$·hour) or less as measured by using water under a pressure of 0.1 MPa. The water permeability is measured by a method described in Examples appearing later. The smaller the value of water permeability, the higher the adhesiveness between the ion exchanger and the filament base material forming less gaps in the membrane despite it is swollen-dried (contracted) repetitively. Specifically, even when the base material is made of easily available monofilaments of a polyethylene having an ordinary molecular weight, low water permeability is maintained as described above offering a very great industrial advantage from the standpoint of production cost.

Upon introducing the ion-exchange groups, the ion-exchange membrane of the present invention has a suitable ion-exchange capacity which is, for example, about 0.1 to about 2.5 meq/g—dry mass. Here, since a high degree of adhesiveness (low water permeability) has been realized between the ion exchanger and the filament base material, the ion-exchange membrane features excellent durability and a current efficiency of, usually, 60 to 85% and, specifically, as high as 65 to 80%. Moreover, the ion-exchange membrane, usually, has a thickness of 60 to 550 μm and a Mullen burst strength of 0.2 to 2.0 MPa. Despite of having such a large strength, the ion-exchange membrane exhibits a membrane resistance of as low as about 5 to about 25 Ω·cm$^2$ in a 0.5 M—NaCl aqueous solution. Being made from the polyolefin, the base material exhibits excellent resistance against the heat, mechanical strength and resistance against chemicals, as a matter of course.

The ion-exchange membrane of the present invention is cut into a suitable size, and is put to use or is placed in the market.

EXAMPLES

The invention will now be described by the following Experimental Examples.

Properties of the filament base materials and of the ion-exchange membranes were measured by the following methods.

1. Melting Points of the Filament Base Materials and of the Polyethylene Particles Measured by using the DSC-220C manufactured by Seiko Instruments Inc. The base material was punched into a circular shape 5 mm in diameter. Several circular materials were overlapped one upon the other to be 3 mg while the polyethylene particles were weighed to be 3 mg and were used as a sample for measurement. They were laid on an open sample pan made of aluminum having a diameter of 5 mm, and on which a clamping cover was placed and was fitted in the aluminum pan using a sample sealer. In a nitrogen atmosphere, the temperature was elevated from 30° C. up to 180° C. at a rate of 10° C./min. to take a measurement. The temperature at a maximum point on a melting endothermic curve was regarded to be the melting point of the base material. When there were a plurality of peaks on the melting curve, the temperature of a peak having the largest peak area was regarded to be the melting point of the base material.

2. Opening Area of the Filament Base Material

Calculated from the diameter (μm) of the filament constituting the base material and the mesh count in compliance with the following formula, $$\text{Opening area (\%)} = (\text{opening})^2 / (\text{opening} + \text{filament diameter})^2 \quad (1)$$

wherein, opening (μm)=25400/mesh count−filament diameter (μm), mesh count=number of filaments per inch.

3. Water Permeability of the Ion-Exchange Membrane

The ion-exchange membrane was held in a cylindrical cell, 50 ml of water was poured from the upper part thereof, and a pressure of 0.1 MPa was applied from the upper side. In this state, the amount of water $W_{PW}$ permeating through the ion-exchange membrane in an hour was measured, and the water permeability was calculated in compliance with the following formula. In this case, the effective area of the membrane was 12.6 cm$^2$.

$$\text{Water permeability (ml/(m}^2 \times \text{hour)}) = W_{pw}/(S \times t) \quad (2)$$

wherein,

S: effective area (m$^2$) of the membrane, t: testing time (hour).

4. Ion-Exchange Capacity and Water Content of the Ion-Exchange Membrane

The ion-exchange membrane was dipped in a 1 mol/L—HCl aqueous solution for not less than 10 hours.

Thereafter, in the case of the cation-exchange membrane, the counter ions of the ion-exchange groups were substituted for the sodium ions from the hydrogen ions in a 1 mol/L—NaCl aqueous solution, and the amount of the free hydrogen ions (A mol) was determined by a potentiometric titrator (COMTITE-900 manufactured by Hiranuma Sangyo Co., Ltd.) by using a sodium hydroxide aqueous solution.

On the other hand, in the case of the anion-exchange membrane, the counter ions were substituted for the nitric acid ions from the chloride ions in a 1 mol/L—NaNO$_3$ aqueous solution, and the amount of the free chloride ions (A mol) was determined by the potentiometric titrator (COMTITE-900 manufactured by Hiranuma Sangyo Co., Ltd.) by using a silver nitrate aqueous solution.

Next, the same ion-exchange membrane was dipped in the 1 mol/L—NaCl aqueous solution for not less than 4 hours, and was washed with the ion-exchanged water to a sufficient degree. Thereafter, the water on the surface was wiped off with a tissue paper, and the mass (Wg) of the membrane was measured while it was wet. Moreover, the ion-exchange membrane was dried at 60° for 5 hours under reduced pressure, and was measured for its weight (Dg) while it was dry. Based on the above measured values, the ion-exchange capacity and water content of the ion-exchange membrane were found in compliance with the following formulas, $$\text{Ion-exchange capacity [meq/g—dry mass]} = A \times 1000/D$$

$$\text{Water content [\%]} = 100 \times (W-D)/D$$

5. Thickness of the Ion-Exchange Membrane

The ion-exchange membrane was dipped in a 0.5 mol/L—NaCl aqueous solution for not less than 4 hours. Thereafter, the water on the surface of the membrane was wiped off with a tissue paper, and the thickness of the membrane was measured by using a micrometer MED-25PJ (manufactured by Mitsutoyo Co.).

6. Resistance of the Ion-Exchange Membrane

The ion-exchange membrane was held in a 2-compartment cell having platinum black electrodes. The cell was filled with a 0.5 mol/L—NaCl aqueous solution on both sides of the ion-exchange membrane, and the resistance across the electrodes was measured at 25° C. by using an AC bridge circuit (at a frequency of 1,000 cycles per sec.). A membrane resistance (Ω·cm$^2$) was found from a difference between the resistance across the electrodes in this case and the resistance across the electrodes measured without installing the ion-exchange membrane. The ion-exchange membrane used for the above measurement was the one that had been equilibrated, in advance, in a 0.5 mol/L—NaCl aqueous solution.

7. Viscosity of the Polymerizable Composition

The polymerizable composition was measured for its viscosity at 25° C. by using a single cylindrical rotary viscometer, VISCOTESTER VT-06, (manufactured by RION Co., Ltd.).

8. Current Efficiency of the Ion-Exchange Membrane

In the case of the cation-exchange membrane, there was used a 2-compartment cell having the following constitution.

Anode (Pt plate) (0.5 mol/L—NaOH aqueous solution)/cation-exchange membrane/(3.0 mol/L—NaOH aqueous solution) cathode (Pt plate)

After an electric current was flown at a current density of 10 A/dm$^2$ for one hour at a liquid temperature of 25° C., the solution on the side of the anode was recovered. Concentrations of the sodium hydroxide in the recovered solution and in the initial solution were determined by a potentiometric titrator (Auto Titrator manufactured by KEM Co.) using a sulfuric acid aqueous solution, and current efficiencies were calculated in compliance with the following formula.

In the case of the anion-exchange membrane, there was used a 2-compartment cell having the following constitution.

Anode (Pt plate) (1.0 mol/L—sulfuric acid aqueous solution)/antion-exchange membrane/(0.25 mol/L—sulfuric acid aqueous solution) cathode (Pt plate)

After an electric current was flown at a current density of 10 A/dm² for one hour at a liquid temperature of 25° C., the solution on the side of the cathode was recovered. Concentrations of the sulfuric acid in the recovered solution and in the initial solution were determined by the potentiometric titrator (Auto Titrator manufactured by KEM Co.) using a sodium hydroxide aqueous solution, and current efficiencies were calculated in compliance with the following formula.

Current efficiency (%)=$(C_B-C_S)/(I \times t/F) \times 100$ wherein,
$C_B$: concentration of the initial solution,
$C_S$: concentration of the solution recovered after the current has been flown,
I: current value (A),
t: current-flowing time (sec),
F: Faraday's constant (96500 C/mol).

9. Testing after Having Repeated the Treatment with the Hot Water of 80° C.

A treatment consisted of dipping the ion-exchange membrane in pure water of 80° C. for one hour and then dipping the ion-exchange membrane in pure water of 25° C. for not less than one hour. The treatment was repeated 10 times and, thereafter, the ion-exchange membrane was measured for its water permeability and current efficiency.

Example 1

A mixture of the following recipe was prepared.

| | |
|---|---|
| Styrene (St) | 39.7 parts by mass |
| Divinylbenzene (DVB) | 5.2 parts by mass |
| Chloromethylstyrene (CMS) | 40.6 parts by mass |
| Acrylonitrile (AN) | 14.5 parts by mass |
| Acetyltributyl citrate (ATBC) | 13.0 parts by mass |
| Tert-butylperoxy-2-ethyl hexanoate (PBO) (Perbutyl O produced by NOF Co.) | 7.3 parts by mass |

To the above mixture was added 87.0 parts by mass of unmodulated spherical low-density polyethylene particles PE1 (Flow Beads LE-1080 produced by Sumitomo Seika Chemicals Co., Ltd. particle size; 6 μm, melting point; 105° C.), and the mixture thereof was stirred for 5 hours to obtain a homogeneous polymerizable composition which possessed a viscosity of 2.2 (dPa·sec).

Next, there was provided the following high-density polyethylene monofilament woven fabric (PE120).
High-density polyethylene monofilament woven fabric (PE120); Nip powerful network produced by NBC Meshtec Inc.)
  Warp: 96 mesh—filament diameter of 106 μm (62 denier)
  Weft: 76 mesh—filament diameter of 122 μm (71 denier)
  Thickness: 260 μm
  Opening area: 38%
  Melting point: 130° C.

The polymerizable composition obtained above was applied onto the above high-density polyethylene monofilament woven fabric (PE120). The woven fabric was then covered on its both surfaces with a polyester film that was removable, and was polymerized at 95° C. for 5 hours.

The obtained membrane-like high molecular body was sulfonated with the chlorosulfonic acid at 40° C. for 2 hours to obtain a cation-exchange membrane. Properties of the obtained cation-exchange membrane were as follows:
  Membrane thickness: 285 μm
  Ion-exchange capacity: 1.4 meq/g—dry mass
  Water content: 30%
  Membrane resistance: 12.2 Ω·cm²
  Water permeability: 0 ml/(m²·hour)
  Current efficiency: 72%

Next, the cation-exchange membrane was subjected to the recurring test conducted at 80° C., and was measured for its water permeability and current efficiency to be 0 ml/(m²·hour) and 68%, respectively. These properties had not been almost deteriorated.

Examples 2 to 6

By using the components shown in Table 1, there were prepared polymerizable compositions in the same manner as in Example 1. Table 1 also shows viscosities of the obtained polymerizable compositions.

In Table 1, 40E and PHC are abbreviations of the following compounds.
  40E: ethylene glycol diglycidyl ether (Epolight 40E, produced by Kyoeisha Chemical Co., Ltd.)
  PHC: 1,1-di-tert-butylperoxycyclohexane (Perhexa C, produced by NOF Co.)

The cation-exchange membranes of the invention were then obtained in the same manner as in Example 1 but changing the polymerization temperature to 100° C. Table 2 shows the properties of the obtained cation-exchange membranes and the results of the recurring test conducted at 80° C.

Example 7

There were provided the following unmodified spherical low-density polyethylene particles (PE2).
Unmodified spherical low-density polyethylene particles (PE2);
  Flow Beads LE-2080 produced by Sumitomo Seika Chemicals Co., Ltd. Particle size: 11 μm
  Melting point: 105° C.

By using the above unmodified spherical low-density polyethylene particles (PE2), a polymerizable composition of components shown in Table 1 was prepared.

The obtained polymerizable composition possessed a viscosity of 4.2 (dPa·sec).

Next, as a polyolefin type monofilament base material, there was provided the following polypropylene woven fabric (PP).
Polypropylene woven fabric (PP);
  Mesh count: 100
  Filament diameter: 68 μm (30 denier)
  Thickness: 128 μm
  Opening area: 53%
  Melting point: 168° C.

A cation-exchange membrane of the invention was obtained in the same manner as in Example 1 but using the above polypropylene woven fabric (PP). Table 2 shows the properties of the obtained cation-exchange membrane and the results of the recurring test conducted at 80° C.

Example 8

There were provided the following spherical ethylene-acrylic acid copolymer particles (PE3).
Spherical ethylene-acrylic acid copolymer particles (PE3);
  Flow Beads LE-209
  Particle size: 10 μm
  Melting point: 101° C.
  Content of acrylic acid unit: 10%

By using the above spherical ethylene-acrylic acid copolymer particles (PE3), a polymerizable composition of components shown in Table 1 was prepared. The polymerizable composition possessed a viscosity of 20.0 (dPa·sec).

Next, a cation-exchange membrane of the invention was obtained in the same manner as in Example 1. Table 2 shows the properties of the obtained cation-exchange membrane and the results of the recurring test conducted at 80° C.

Example 9

A polyvinyl chloride (PVC) was added as the thickener, and a polymerizable composition shown in Table 1 was prepared. The polymerizable composition possessed a viscosity of 1.5 (dPa·sec).

Next, a cation-exchange membrane of the invention was obtained in the same manner as in Example 2. Table 2 shows the properties of the obtained cation-exchange membrane and the results of the recurring test conducted at 80° C.

Example 10

A mixture of the following recipe was prepared.

| | |
|---|---|
| Chloromethylstyrene (CMS) | 54.0 parts by mass |
| Divinylbenzene (DVB) | 4.0 parts by mass |
| Styrene (St) | 30.0 parts by mass |
| Acrylonitrile (AN) | 12.0 parts by mass |
| Ethylene glycol diglycidyl ether (40E) (Epolight 40E, produced by Kyoeisha Chemical Co., Ltd.) | 2.0 parts by mass |
| 1,1-di-tert-butylperoxycyclohexane (PBO) (Perhexa C, produced by NOF Co.) | 7.3 parts by mass |

To the above mixture was added 87.0 parts by mass of unmodulated spherical low-density polyethylene particles (PE1), and the mixture thereof was stirred for 5 hours to obtain a homogeneous polymerizable composition which possessed a viscosity of 2.0 (dPa·sec).

Next, there was provided the following high-density polyethylene monofilament woven fabric (PE200).
High-density polyethylene monofilament woven fabric (PE200); Nip powerful network produced by NBC Meshtec Inc.)
  Warp: 156 mesh—filament diameter of 86 μm (50 denier)
  Weft: 100 mesh—filament diameter of 86 μm (50 denier)
  Thickness: 185 μm
  Opening area: 32%
  Melting point: 130° C.

The composition obtained above was applied onto the above high-density polyethylene monofilament woven fabric (PE200). The woven fabric was then covered on its both surfaces with a polyester film that was removable, and was polymerized at 100° C. for 5 hours. The obtained membrane-like high molecular body was dipped in a mixture of 15 parts by mass of an aqueous solution containing 30% of trimethylamine, 52.5 parts by mass of water and 22.5 parts by mass of acetone maintaining a temperature of 30° C. for 16 hours, and there was obtained a quaternary ammonium type anion-exchange membrane.

Table 2 shows the properties of the obtained anion-exchange membrane and the results of the recurring test conducted at 80° C.

Example 11

The polymerizable composition of Example 1 was applied onto the high-density polyethylene monofilament woven fabric (PE200). The woven fabric was then covered on its both surfaces with a polyester film that was removable, and was polymerized at 95° C. for 5 hours. The obtained membrane-like high molecular body was sulfonated with the chlorosulfonic acid at 40° C. for 2 hours to obtain a cation-exchange membrane.

Table 2 shows the properties of the obtained cation-exchange membrane and the results of the recurring test conducted at 80° C.

Example 12

By using the polymerizable composition of Example 1, a cation-exchange membrane of the present invention was obtained in the same manner as in Example 7.

Table 2 shows the properties of the obtained cation-exchange membrane and the results of the recurring test conducted at 80° C.

Comparative Example 1

A polymerizable composition shown in Table 1 was prepared without, however, adding the nitrogen-containing aliphatic monomer, and a cation-exchange membrane was obtained in the same manner as in Example 1.

Table 2 shows the properties of the obtained cation-exchange membrane and the results of the recurring test conducted at 80° C. As compared to Example 1, the water permeability and the current efficiency had been deteriorated. After the recurring test conducted at 80° C., these properties had been deteriorated further strikingly.

Comparative Examples 2 to 5

Polymerizable compositions of components shown in Table 1 were prepared by using the nitrogen-containing aliphatic monomer and the polyethylene particles in amounts very different from the amounts of Example 1. The obtained polymerizable compositions possessed viscosities as shown in Table 1.

By using the obtained polymerizable compositions, cation-exchange membranes were prepared in the same manner as in Example 2. In Comparative Example 5, the viscosity of the polymerizable composition was so high that a homogeneous membrane-like product could not be obtained.

Table 2 shows the properties of the cation-exchange membranes obtained in Comparative Examples 2 to 5 and the results of the recurring test conducted at 80° C.

Comparative Example 6

A polymerizable composition was prepared in the same manner as in Example 9 but without adding the nitrogen-containing aliphatic monomer, and a cation-exchange membrane was obtained in the same manner as in Example 9. Table 2 shows the properties of the obtained cation-exchange membrane and the results of the recurring test conducted at 80° C.

Comparative Example 7

A polymerizable composition was prepared in the same manner as in Example 10 but without adding the nitrogen-containing aliphatic monomer, and an anion-exchange membrane was obtained in the same manner as in Example 10. Table 2 shows the properties of the obtained anion-exchange membrane and the results of the recurring test conducted at 80° C.

TABLE 1

| | Components of polymerizable composition (parts by mass) | | | | | | | |
|---|---|---|---|---|---|---|---|---|
| | Aromatic monomer for introducing exchange group | | Crosslinking monomer | | Nitrogen-containing aliphatic monomer | | Other monomer | |
| Example | Kind | Amount | Kind | Amount | Kind | Amount | Kind | Amount |
| 1 | St | 39.7 | DVB | 5.2 | AN | 14.5 | CMS | 40.6 |
| 2 | St | 39.7 | DVB | 5.2 | AN | 10.5 | CMS | 44.6 |
| 3 | St | 39.7 | DVB | 5.2 | AN | 29.0 | CMS | 26.1 |
| 4 | St | 39.7 | DVB | 5.2 | AN | 14.5 | CMS | 40.6 |
| 5 | St | 39.7 | DVB | 5.2 | AN | 14.5 | CMS | 40.6 |
| 6 | St | 39.7 | DVB | 5.2 | DMAA | 14.5 | CMS | 40.6 |
| 7 | St | 39.7 | DVB | 5.2 | AN | 14.5 | CMS | 40.6 |
| 8 | St | 39.7 | DVB | 5.2 | AN | 14.5 | CMS | 40.6 |
| 9 | St | 39.7 | DVB | 5.2 | AN | 14.5 | CMS | 40.6 |
| 10 | CMS | 54.0 | DVB | 4.0 | AN | 12.0 | St | 30.0 |
| Comp. Ex. 1 | St | 39.7 | DVB | 5.2 | — | — | CMS | 55.1 |
| Comp. Ex. 2 | St | 39.7 | DVB | 5.2 | AN | 5.0 | CMS | 50.1 |
| Comp. Ex. 3 | St | 39.7 | DVB | 5.2 | AN | 38.0 | CMS | 17.1 |
| Comp. Ex. 4 | St | 39.7 | DVB | 5.2 | AN | 14.5 | CMS | 40.6 |
| Comp. Ex. 5 | St | 39.7 | DVB | 5.2 | AN | 14.5 | CMS | 40.6 |
| Comp. Ex. 6 | St | 39.7 | DVB | 5.2 | — | — | CMS | 55.1 |
| Comp. Ex. 7 | CMS | 54.0 | DVB | 4.0 | — | — | St | 42.0 |

| | Components of polymerizable composition (parts by mass) | | | | | | Viscosity of polymerizable composition |
|---|---|---|---|---|---|---|---|
| | Polyethylene powder | | Other blending agent | | Polymerization initiator | | |
| Example | Kind | Amount | Kind | Amount | Kind | Amount | (dPa · sec) |
| 1 | PE1 | 87.0 | ATBC | 13.0 | PBO | 7.3 | 2.2 |
| 2 | PE1 | 87.0 | ATBC | 13.0 | PHC | 7.3 | 1.9 |
| 3 | PE1 | 87.0 | ATBC | 13.0 | PHC | 7.3 | 4.3 |
| 4 | PE1 | 70.0 | ATBC | 11.0 | PHC | 7.3 | 1.5 |
| | | | 40E | 2.0 | | | |
| 5 | PE1 | 104.0 | ATBC | 11.0 | PHC | 7.3 | 4.7 |
| | | | 40E | 2.0 | | | |
| 6 | PE1 | 87.0 | ATBC | 13.0 | PHC | 7.3 | 1.2 |
| 7 | PE2 | 87.0 | ATBC | 13.0 | PBO | 7.3 | 4.2 |
| 8 | PE3 | 87.0 | ATBC | 13.0 | PBO | 7.3 | 20.0 |
| 9 | PE1 | 60.0 | ATBC | 13.0 | PHC | 7.3 | 1.5 |
| | | | PVC | 30.0 | | | |
| 10 | PE1 | 87.0 | 40E | 2.0 | PHC | 7.3 | 2.0 |
| Comp. Ex. 1 | PE1 | 87.0 | ATBC | 13.0 | PBO | 7.3 | 1.2 |
| Comp. Ex. 2 | PE1 | 87.0 | ATBC | 13.0 | PHC | 7.3 | 1.4 |
| Comp. Ex. 3 | PE1 | 87.0 | ATBC | 13.0 | PHC | 7.3 | 5.3 |
| Comp. Ex. 4 | PE1 | 40.0 | ATBC | 13.0 | PHC | 7.3 | 0.3 |
| Comp. Ex. 5 | PE1 | 130.0 | ATBC | 13.0 | PHC | 7.3 | 40.0 |
| Comp. Ex. 6 | PE3 | 87.0 | ATBC | 13.0 | PHC | 7.3 | 18.0 |
| Comp. Ex. 7 | PE1 | 87.0 | 40E | 2.0 | PHC | 7.3 | 1.8 |

TABLE 2

| | | | Properties of ion-exchange membrane | | |
|---|---|---|---|---|---|
| Example | Polyolefin type filament base material | Polymerization temperature [° C.] | Membrane thickness [μm] | Resistance [Ω · cm$^2$] | Ion-exchange capacity [meq/g-dry mass] |
| 1 | PE120 | 95 | 285 | 12.2 | 1.4 |
| 2 | PE120 | 100 | 281 | 15.0 | 1.2 |
| 3 | PE120 | 100 | 295 | 14.0 | 1.4 |
| 4 | PE120 | 100 | 299 | 11.0 | 1.6 |
| 5 | PE120 | 100 | 295 | 18.3 | 1.3 |
| 6 | PE120 | 100 | 283 | 13.3 | 1.4 |
| 7 | PP | 95 | 163 | 6.8 | 1.4 |
| 8 | PE120 | 95 | 317 | 8.7 | 1.8 |
| 9 | PE120 | 100 | 279 | 12.8 | 1.4 |
| 10 | PE200 | 100 | 208 | 12.0 | 1.4 |
| 11 | PE200 | 95 | 214 | 12.0 | 1.5 |
| 12 | PP | 95 | 157 | 7.6 | 1.4 |
| Comp. Ex. 1 | PE120 | 95 | 276 | 17.0 | 1.1 |
| Comp. Ex. 2 | PE120 | 100 | 278 | 16.0 | 1.2 |

TABLE 2-continued

| | | | | | |
|---|---|---|---|---|---|
| Comp. Ex. 3 | PE120 | 100 | 314 | 9.0 | 1.6 |
| Comp. Ex. 4 | PE120 | 100 | 305 | 7.7 | 1.8 |
| Comp. Ex. 5 | PE120 | 100 | membrane could not be formed | | |
| Comp. Ex. 6 | PE120 | 100 | 306 | 11.7 | 1.4 |
| Comp. Ex. 7 | PE200 | 100 | 215 | 9.7 | 1.5 |

| | Properties of ion-exchange membrane | | | Properties after treated with hot water of 80° C. for 10 times | |
|---|---|---|---|---|---|
| Example | Water content [%] | Water permeability [ml/m² · Hr] | Current efficiency [%] | Water permeability [ml/m² · Hr] | Current efficiency [%] |
| 1 | 30 | 0 | 72 | 0 | 68 |
| 2 | 24 | 8 | 67 | 32 | 61 |
| 3 | 34 | 0 | 70 | 8 | 65 |
| 4 | 34 | 0 | 71 | 0 | 67 |
| 5 | 29 | 0 | 71 | 0 | 67 |
| 6 | 28 | 0 | 71 | 8 | 66 |
| 7 | 29 | 16 | 64 | 32 | 59 |
| 8 | 33 | 0 | 71 | 8 | 66 |
| 9 | 27 | 0 | 74 | 0 | 71 |
| 10 | 29 | 0 | 46 | 0 | 42 |
| 11 | 32 | 0 | 70 | 0 | 67 |
| 12 | 28 | 16 | 63 | 48 | 58 |
| Comp. Ex. 1 | 22 | 80 | 62 | 250 | 55 |
| Comp. Ex. 2 | 23 | 56 | 64 | 128 | 56 |
| Comp. Ex. 3 | 34 | 64 | 63 | 208 | 55 |
| Comp. Ex. 4 | 36 | 350 | 50 | >1000 | 41 |
| Comp. Ex. 5 | membrane could not be formed | | | | |
| Comp. Ex. 6 | 25 | 56 | 67 | 136 | 56 |
| Comp. Ex. 7 | 32 | 56 | 43 | 148 | 37 |

The invention claimed is:

1. A polymerizable composition for forming an ion-exchange resin precursor, said polymerizable composition containing a monomer component and polyethylene particles in an amount of 50 to 120 parts by mass per 100 parts by mass of said monomer component, wherein said monomer component contains an aromatic monomer for introducing ion-exchange groups and a nitrogen-containing aliphatic monomer, said nitrogen-containing aliphatic monomer being present in an amount of 10 to 35% by mass in said monomer component,
    wherein said polyethylene particles are unmodified polyethylene particles.

2. The polymerizable composition according to claim 1, wherein said nitrogen-containing aliphatic monomer is an acrylonitrile.

3. A method of producing an ion-exchange membrane by applying the polymerizable composition of claim 1 onto a polyolefin type filament base material and polymerizing said polymerizable composition to form an ion-exchange resin precursor and, thereafter, introducing ion-exchange groups into said precursor.

4. The method of producing the ion-exchange membrane according to claim 3, wherein said polyolefin type filament base material is a polyolefin type monofilament base material.

5. The method of producing the ion-exchange membrane according to claim 3, wherein said polyolefin type filament base material is a polyethylene type filament base material.

* * * * *